United States Patent [19]
Adams

[11] Patent Number: 6,129,617
[45] Date of Patent: Oct. 10, 2000

[54] ABRASIVE MEMBER HOLDER FOR RECIPROCATING SAW

[76] Inventor: Christopher M. Adams, P.O. Box 1086, Verdi, Nev. 89439

[21] Appl. No.: 08/804,275

[22] Filed: Mar. 3, 1997

[51] Int. Cl.[7] .............................. B24B 23/00; B24B 27/08
[52] U.S. Cl. .................... 451/356; 83/699.21; 83/698.11
[58] Field of Search ................................. 83/699.21, 783, 83/784, 785, 786, 613, 647, 698.11, 698.71; 451/356, 344, 461, 462, 523, 524, 525, 526, 533, 538, 539; 125/18; 30/392, 393, 394, 350

[56] References Cited

U.S. PATENT DOCUMENTS

| | | | |
|---|---|---|---|
| 108,981 | 11/1870 | Delude | 83/699.21 |
| 133,810 | 12/1872 | Sproul | 83/699.21 |
| 286,354 | 10/1883 | Wilkin | 83/699.21 |
| 570,094 | 10/1896 | Heyn | 83/699.21 |
| 2,772,708 | 12/1956 | Miquel | 83/699.21 |
| 3,874,126 | 4/1975 | Catlin et al. | 51/393 |
| 3,914,906 | 10/1975 | Barnes | 51/170 TL |
| 4,670,986 | 6/1987 | Chen | 30/392 |
| 4,707,947 | 11/1987 | Harris | 51/181 R |
| 4,802,310 | 2/1989 | Holmes | 51/170 MT |
| 4,807,507 | 2/1989 | Rice et al. | 83/783 |
| 4,838,138 | 6/1989 | Rice et al. | 83/698 |
| 4,841,823 | 6/1989 | Brundage | 83/781 |
| 4,953,431 | 9/1990 | Chen | 83/781 |
| 4,977,712 | 12/1990 | Fisher et al. | 51/380 |
| 5,016,512 | 5/1991 | Huang | 83/783 |
| 5,058,280 | 10/1991 | Pollack | 30/392 |
| 5,105,704 | 4/1992 | Chang | 83/662 |
| 5,272,948 | 12/1993 | Theising | 83/786 |
| 5,351,590 | 10/1994 | Everts et al. | 83/699.21 |

OTHER PUBLICATIONS

Flexifile, Creations unlimited Hobby Products, Dept. P, Grand Rapids MI 49505.

*Primary Examiner*—Derris H. Banks
*Attorney, Agent, or Firm*—Skjerven, Morrill, MacPherson LLP; David E. Steuber

[57] ABSTRACT

This invention relates to reciprocating saws, and to abrasive sanding attachments and blades for such saws, to facilitate the oscillating, the reciprocating sanding, and the shaping of straight, curved, concave or convex surfaces, with abrasive cutting surfaces. The invention described herein fits and mounts in blade holders currently in use on scroll saws, and is designed to take advantage of pin-end and plain pinless-end saw blade mounting methods as applied to holding an abrasive member. This invention increases the versatility and use of the scroll saw and related C-shaped saws, as tools for use in intricate, delicate, and controlled woodworking, metalworking, and finishing. Methods for making abrasive member holders 40, 68, 74, 84, 104, 112, 124, 142, and 160 are disclosed. The holders can be mounted on pin-end blade or pin-less blade scroll saws using abrasive member head, extenders and pivot heads.

18 Claims, 16 Drawing Sheets

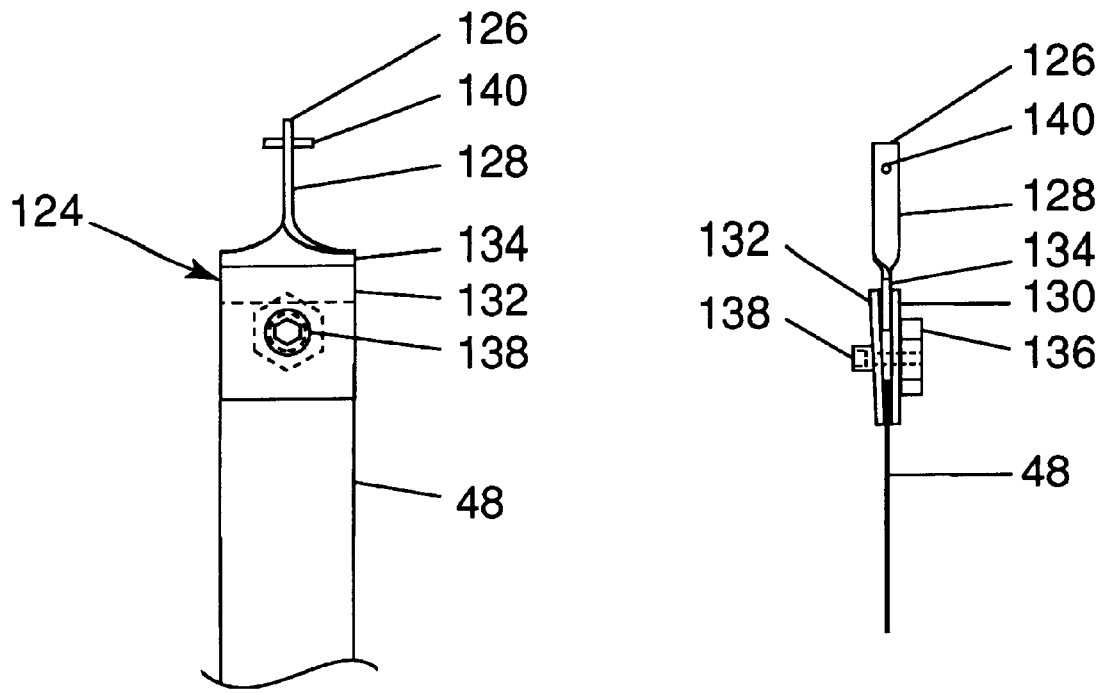
Figure 28
Figure 29
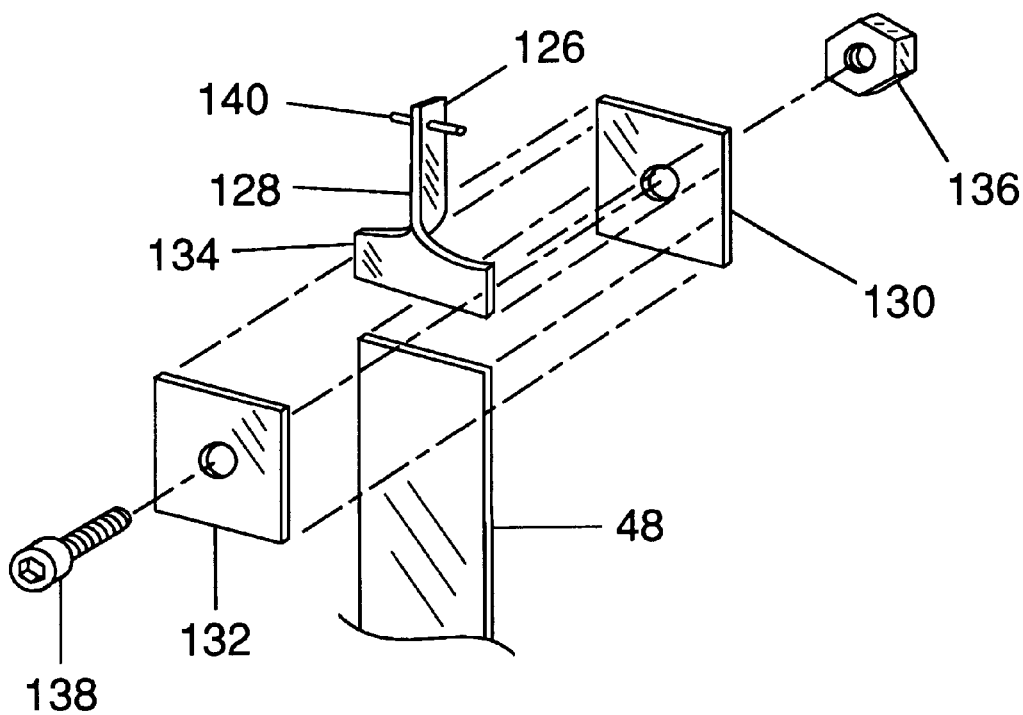
Figure 30

New Use of Prior Art

ABRASIVE MEMBER HOLDER FOR RECIPROCATING SAW

INTRODUCTION

A variety of powered sanding tools are currently manufactured, such as belt sanders, oscillating spindle sanders, orbital sanders, detail corner sanders, disc sanders, or like. A belt sander uses a conventional closed loop abrasive belt operating in one continuous direction requiring the return direction be positioned as not to abrade any undesired surface. An oscillating spindle sander mounted in a horizontal table, or oriented drill press, uses an abrasive attached to a 0.5 inch or larger diameter shaft which, while rotating the abrasive surface, oscillates parallel to the axis of the shaft. An orbital sander provides a circular motion of a flat abrasive surface in the plane of the flat surface. A detail corner sander is hand held and uses a vibrating flat triangular surface to reach tight corners inaccessible by orbital sanders. A disc sander with a rotating motor shaft utilizes flat abrasive plates, from 4 to 6 inches or more in diameter, whose circular motion as the motor shaft rotates allows the workpiece to be guided against the flat abrasive surface.

Fine detailed sanding of curved, concave, convex, delicate surfaces, fine and narrow, and closed internal hole surfaces cannot be performed using many powered sanding tools currently manufactured. The closed loop of a belt sander does not allow internal sanding of circles, slots, or like. The spindle sander cannot sand slots and internal cut-outs narrower than 0.5 inches. For spindle and belt sanders, care must be taken not to allow the opposite side of the workpiece from the main cutting area to be damaged by unwanted abrasion. The orbital sander, corner detail sander, and disc sander do not permit sanding of concave, or easy control with convex surfaces.

BACKGROUND OF THE INVENTION

Scroll saws are widely used by amateur and professional woodworkers and are particularly useful for cutting decorative 2-dimensional figures from wood using an elongate scroll saw blade which makes small and curvateous cuts. Current scroll saw models utilize a variety of parallel arms forming C-shapes pivoting to provide vertically aligned movement of thin saw blades suspended between the ends of the arms. To cut out a section within a workpiece a hole is first drilled in the wood within a portion of the wood the blade will cut out, and the blade inserted and mounted on the scroll saw to begin the cutout. Many operators of scroll saws use small blades which provide relatively smooth cuts through wood that do not require further finishing. In many cases the operators conclude that no further finishing is required mainly because no quick and easy method for finishing and controlling the finishing has been previously available. Other users find that burn marks, rough cut edges, and other imperfections require considerable further and laborious hand finishing. These finishing requirements are especially prevalent with low cost scroll saws using pin-end blades, and are many times desired by high-end, more costly pin-less and pin-end scroll saw users. In the cutting of the intricate designs, a great deal of time is required to fasten and unfasten scroll saw blades, and consequently a rapid method of inserting and mounting a finishing tool, or abrasive, on a scroll saw is required. Unfortunately, there has been no equivalent scroll saw abrading system which is as quickly fastened and unfastened as scroll saw blades. The subject invention embodiments address these issues.

There are, commercially available, a variety of reciprocating small hand and electric oscillating and sanding tools and saws that make use of a replaceable sanding, abrading, or cutting elements such as sandpaper sheets and sandpaper belts. Some hand and mechanical sanders are comprised of clamps which secure the ends of a piece of an abrasive firmly supported against a backing. These tools range from hand held blocks to reciprocating or orbiting sanding surfaces at high speeds. Most tools are not ordinarily useful for small delicate sanding, sanding of small and unusually-shaped work pieces, or delicate sanding of very complicated internal small and narrow spaced areas. The embodiments of this invention provide a tool to facilitate work and provide better quality of sanding finishes. The advent of advanced techniques of support and belt design, durability, materials, and manufacture of the support has allowed these embodiments to take advantage of new technologies and materials. The abrading materials attached to belts, bands, strips, meshes, and abrasive members have been manufactured with metal, cloth, or other reinforced backing materials, with cutting surfaces comprised of particulate materials such as steel, metals, carbides, borides, nitrides, silicates, tungsten, or equivalent diamond substitute materials fused or adhered to the surface. These abrasive particles provide a multiplicity of cutting edges of size and shape. The backings provide substantial tensile strength which thereby increases the strength and durability of the sandpaper and permits its use without conventional support that sandpaper ordinarily requires when used without such backing.

U.S. Pat. No. 4,977,712 by Fisher, et. al., details a hand sander with abrasive member belt. The system offers a hand sander with a very narrow jaw depth. The system uses a complicated tensioning mechanism. The instrument must be purchased separately and is not an accessory tool or item. The abrasive strip cannot be mounted evenly to provide even tension using the tapered pegs, holes and recesses.

U.S. Pat. No. 3,874,126 by Catlin, et. al. details a flexible abrading tool utilizing a specially made metal or grit impregnated band with a rigid backing. The system cannot be applied to a scroll saw. The system provides limited control and narrow jaw depth for use due to the hand held saw construction, limited tensioning, and cannot be carefully controlled with respect to band angles and depth. The tool does not leave the operator's hands free for precise manipulation of workpiece movement. The abrading tool is expensive to manufacture, replace, and is not disposable. The hardened steel structure produces grooves on materials and cannot contour to surfaces. The blade mounts only in hand held narrow C-shaped saws, and the brackets can only clamp and hold the abrasive blade if the blade is made of metal. The tool is specifically built and comparatively expensive.

U.S. Pat. No. 4,802,310 by Holmes details an elastic backing to hold an inelastic abrasive sheet which delaminates easily from the adhering surface junction. The contact adhesive cannot withstand the multiple releasing and re-adhering processes. The jaw depth is limited and the elastic cannot provide controlled pressure of the abrasive sheet to the working surface. Uniform band tensioning is difficult to control.

A number of scroll saw clamps for holding pin and plain pin-less end scroll saw blades have been designed to facilitate use and rapid replacement of various saw blades. In general, a sabre saw can be designated as a power tool where one end of a saw blade is fixed in a mounting. A reciprocating saw can be designated as a tool where two symmetrically disposed ends are fixed in a mounting. A scroll saw is a power tool whereby the reciprocating action is augmented by a power tool motor component. Representative scroll saw blade holders are found in U.S. Pat. Nos. 5,351,590 by Evert, et. al., 5,272,948 by Theising, 5,105,704 by Chang, 5,058,280 by Pollak, 5,016,512 by Huang, 4,953,431 by Chen, 4,841,823 by Brundage, and 4,838,138 by Rice, et. al., 4,807,507 by Rice, et. al., and 4,670,986 by Chen. All have small narrow clamping surfaces as a necessary requirement for the suspension of the blade in reciprocating saw. All address the pivoting movement required to maintain the movement of the blade for a straight vertical cut. All scroll saw clamp designs have the pivot point parallel to the oscillating axis of the scroll saw and allow the blades to be mounted in one orientation as a necessary and sufficient requirement of all designs. All clamps securing pin-less scroll saw blades have surfaces, screws or clamps which hold the narrow saw blades using screws and levers to increase surface clamping pressure and facilitate rapid interchangeability. These clamps also address orientation of scroll saw blades, for example at 0, 90, 180, and 270 degrees. The tensioning of a mounted blade is performed by a screw or lever which increases the spacing between the ends of the scroll saw arms. For pin-end blades, and other pin-less blade holders, the mounting brackets do not clamp the pin-end in place, rather the pins of the saw blades rest in recesses, or grooves on a mounting plate or arm, which provide the pivot point and exact placement of the blade in the scroll saw.

U.S. Pat. No. 3,914,906 by Barnes details a sanding member for a reciprocating saw. The sanding or abrading blade on the sabre saw cannot be viewed by the user during operation to determine the extent of sanding and removal of ridges and contour lines. The blades are flexible and cannot provide even pressure longitudinally in the direction of blade motion. The adhesive sheet is difficult to replace and can delaminate from the rigid support backing. The rigid support member is thick and cannot contour to narrow radiused convex and concave surfaces. In such a capacity it generates, rather than eliminates, sanding grooves. When symmetrically supported the system cannot sand surfaces of small radii. The metal band support cannot curve and delaminates from the abrasive sheet. The adhesive holding the abrasive sheet to the metal support backing must be removed completely from the support for adhesive sheet material replacement, and these abrasive sheets must be cut individually. The individuality of each support, and cutting of each abrasive sheet, as well as difficulties in applying the abrasive sheet in the correct alignment and orientation, create significant difficulties with use and replacement. Any adhesive material used to affix the old sandpaper to the metal backing which remains on the rigid back support member prior to application of a new abrasive sheet over these areas can cause rises and flaws on the abrasive surface and is subsequently expressed as damage on the workpiece. The system is not disposable, not easily interchanged for various grit sizes without removing the abrasive sheet, and hence not convenient to operate. This limits rapid interchangeability of sanding surfaces. The Barnes system as presented cannot be mounted in place in many of the current manufactured scroll saw mounting systems.

U.S. Pat. No. 4,841,823 by Brundage details a scroll saw blade holder and positioner permitting adjustment of the saw blade relative to the pivot beams, or arms, of the scroll saw such that the plane movement of the blade is coincident with the blade directly, particularly in the event that the ends of the arms are somewhat misaligned with respect to the plane of travel of the arms due to inaccuracies of the arm pivot beam locations and cutting stress bending loads of the blade during operation. The holder and associated mounting components are expensive to manufacture as well as complex to assemble and align.

U.S. Pat. No. 4,707,947 by Harris details a system using a hard stone over an abrasive element adhered to a surface blade for a sabre saw. The disadvantages of the hard stone member are similar to those found in U.S. Pat. No. 3,914,906.

U.S. Pat. No. 4,953,431 by Chen details a plain pin-less scroll saw blade holder, saw blade suspension device for clamping of small commerically available pin-less scroll saw blades. The fine pin-less blade is inserted in a ⅛" diameter hole and clamped between two set screws. The small diameter hole for the blade accepts only pin-less metal scroll saw blades. The device provides a very complex to assemble, awkward to handle and use, pin-less blade holder which is costly to manufacture. The holder clamps only metal blades and not flexible, softer materials, thus cannot hold onto an abrasive member without damaging the support material.

U.S. Pat. No. 4,670,986 by Chen represents a method for clamping a pin-less saw blade whereby the holder provides the pivot point for the blade on the arm of a scroll saw. The system requires that the saw blade be released prior to and after inserting in a small hole for cutting. A number of additional tools or fastening assistance devices are required to provide sufficient clamping force to suspend the blade. The clamping surface area is small and narrow, yet sufficient to clamp the blade without blade end distortion.

U.S. Pat. No. 4,838,138 by Rice, et. al., details a pin-less blade holder and aligning device for a scroll saw. Like U.S. Pat. Nos. 4,953,431, 4,807,507 and 4,670,986 the holders require separate tools for blade installation and alignment for clamping only thin and arrow pin-less blades.

U.S. Pat. No. 5,351,590 by Everts, et. al., details a pin-less scroll saw blade holder, saw blade suspension device for clamping of small commercially available pin-less scroll saw blades. The holder provides a clamping force on a plain pin-less scroll saw blade through a pair of jaws by way of a thumbscrew and actuator. The depth of the blade is limited, allowing only pin-less blades to be clamped. The holder cannot turn 90 degrees for an alternative cutting direction.

U.S. Pat. No. 5,058,280 by Pollak details a pin and pin-less scroll saw blade holder nearly identical to U.S. Pat. No. 4,953,431 with the added feature of a sliding metal plate which inserts between the pin-less blade and the commonly incorporated clamping screws. The function of the plate is to allow a slightly increase clamping area for the blade and prevent distortion of the blade end. While providing somewhat increased surface area the holder accepts only narrow blades, cannot hold varied cross-sectional area pieces, cannot hold wide strips uniformly, is bulky and comprised of several individual pieces, and is not disposeable. The blade and mount cannot be rotated.

Flexifile, by Creations Unlimited Hobby Products, Dept P, Grand Rapid, Mich. 49505, offers the user a symmetrically disposed, two loop, narrow and fine abrasive member supported by two pins at the ends of a handheld C-shaped holder. In such a configuration, the C-shaped holder does not allow adjustable tensioning, operation allows only one hand free for control, and provides only narrow fine abrasives. The depth of the holder is limited to approximately 4 inches, which limits application use. The system is very small and cannot be adapted to a scroll saw. The system does not allow the user to carefully guide the work. The abrasive member is very weak, and cannot be used on large wooden pieces.

OBJECTS AND ADVANTAGES

The present embodiments of the invention incorporate all scroll saw blade mounting designs and remedy the inadequacies above. The preferred embodiments include an abrasive member head for holding an abrasive member between the arms and blade mounts of a scroll saw and similar C-shaped saws.

It is therefore an object of the present invention to provide a means of mounting and holding an abrasive member in a scroll saw, reciporating saw, C-shaped saw, coping saw, hack saw, jeweler's saw, or like.

It is a further object of this invention to provide an abrasive member for C-shaped saws, like scroll saws, supported at the ends with improved and universal mounting on reciprocating saw and saw blade systems.

It is a further object of this invention to provide a tool accessory having a flexible sanding surface for reciprocating movement while applying a force normal to the direction of reciprocating movement to effect sanding over a non-planar, or planar surface of a workpiece.

It is a further object of this invention to provide simple use and easy control, easy tensioning, easy labor and time saving interchangeability, more reliability, replacement, and disposability, with flexibility and rigidity.

It is a further object of this invention to provide clear observation of sanding and abrasive surface contact.

It is a further object of this invention to provide the ability to sand cutouts containing no band saw required insertion cuts, and a facile method for sanding cuts, slots, and inaccessible member surfaces.

It is a further object of this invention to provide sanding of narrow cuts, sanding of curved and flowing surfaces, sanding of small circumferences, internal comers, and facilitate work on small, as well as large, irregular pieces where power tools are difficult to control.

It is a further object of this invention to eliminate laborious sanding on large extended surfaces and scroll work.

It is a further object of this invention to allow precise angle orientation of the abrading surface with the table and work object.

It is a further object of this invention to remove cutting marks, or like, a means of using all materials sandpapers, abrasives, polishers, hones, or saw blades for interchangeable rasping, sanding finishing, sharpening, and polishing.

It is a further object of this invention to provide variable abrasive member surface widths, variable lengths, variable thicknesses, variable flexibility, and variable cross-sectional shapes.

It is a further object of this invention to provide support of one or both ends of the abrasive member for taut holding of the member.

It is a further object of this invention to provide few moving or adjustable parts.

It is a further object of this invention to allow ease of manufacture, and durable construction.

It is a further object of this invention to provide interchangeability and use in pin-less clamping blade holders.

It is a further object of this invention to provide retainment of the abrasive member as an integral part of the holder for ease of manufacture and function incorporating a simple unitized molded abrasive holder and permit use of varied manufacturing materials for holder fabrication and classification.

It is a further object of this invention to provide interchangeability and universal attachment among mechanical powered and hand-held C-shaped saws.

It is a further object of this invention to provide a clamping and universal attachment means in C-shaped hand saws allowing easy adjustment.

It is a further object of this invention to eliminate the rigid backing and adhesive backed sandpaper, and material required to fix an abrasive sheet to other support possibilities and systems.

It is a further object of this invention to have the abrasive member longitudinally internally reinforced by the abrasive member material belt or band.

It is a further object of this invention to provide a myriad of abrasive grades, compositions, and grits for the abrasive member;

It is a further object of this invention to provide a holder which can be used in manually operated saws, handsaws for example, hack saws, coping saws, jeweler's saws, hand holds, as well as scroll saws, for abrading or delicating sanding components, and for use in particular trades or hobbies, such as jewelers, filigree and fret woodworkers, gunsmiths, or like.

It is a further object of this invention to provide enlarged surfaces, holders and handles to use abrasive members on large woodworking tasks and workpieces.

It is a further object of this invention to provide the ability to use a wet or lubricated abrasive member surfaces for metals, plastics or composite pieces.

It is a further object of this invention to provide in a separate clamping arrangement in reusable systems eliminating the disadvantage of a screw inhibiting the depth stop or jaw width of the abrasive into the holder.

It is a further object of this invention to provide even load distribution by the holder for the abrasive member.

It is a further object of this invention to allow variable speed for the reciprocating saw.

It is a further object of this invention to allow non-symmetrical mounting and tensioning.

The above and other objects, benefits and advantages of the present invention will become more apparent from the following descriptions when taken in conjunction with the acompanying drawings in which preferred embodiments of the present inventions are shown by way of illustrative example.

BRIEF DESCRIPTION OF DRAWINGS

FIG. 28 is a front view of a preferred embodiment of the invention which allows clamping and replacement of the abrasive member.

FIG. 29 is a side view of a preferred embodiment of the invention which allows clamping and replacement of the abrasive member.

FIG. 30 is a exploded view of a preferred embodiment of the invention which allows clamping and replacement of the abrasive member, and indicates the parts for assembly.

BEST MODES FOR CARRYING OUT THE INVENTION

Figure 1:
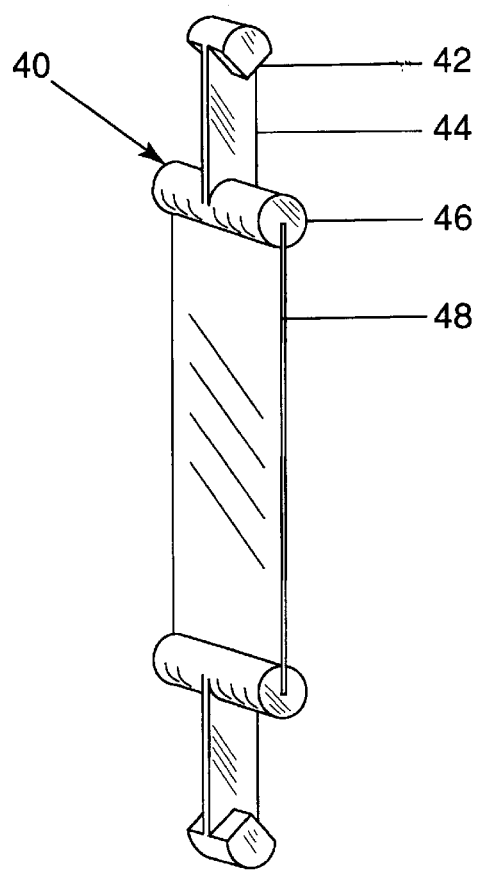
FIG. 1 is a perspective view of a preferred embodiment of the invention.
Figure 2:
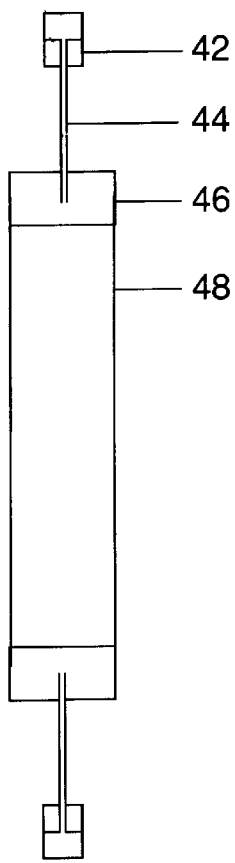
FIG. 2 is a front view of a preferred embodiment of the invention.
Figure 3:
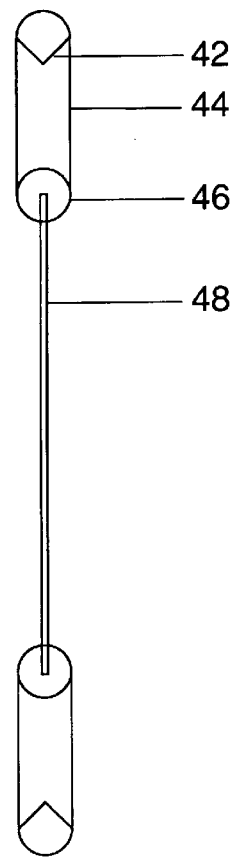
FIG. 3 is a side view of a preferred embodiment of the invention.
Figure 4:
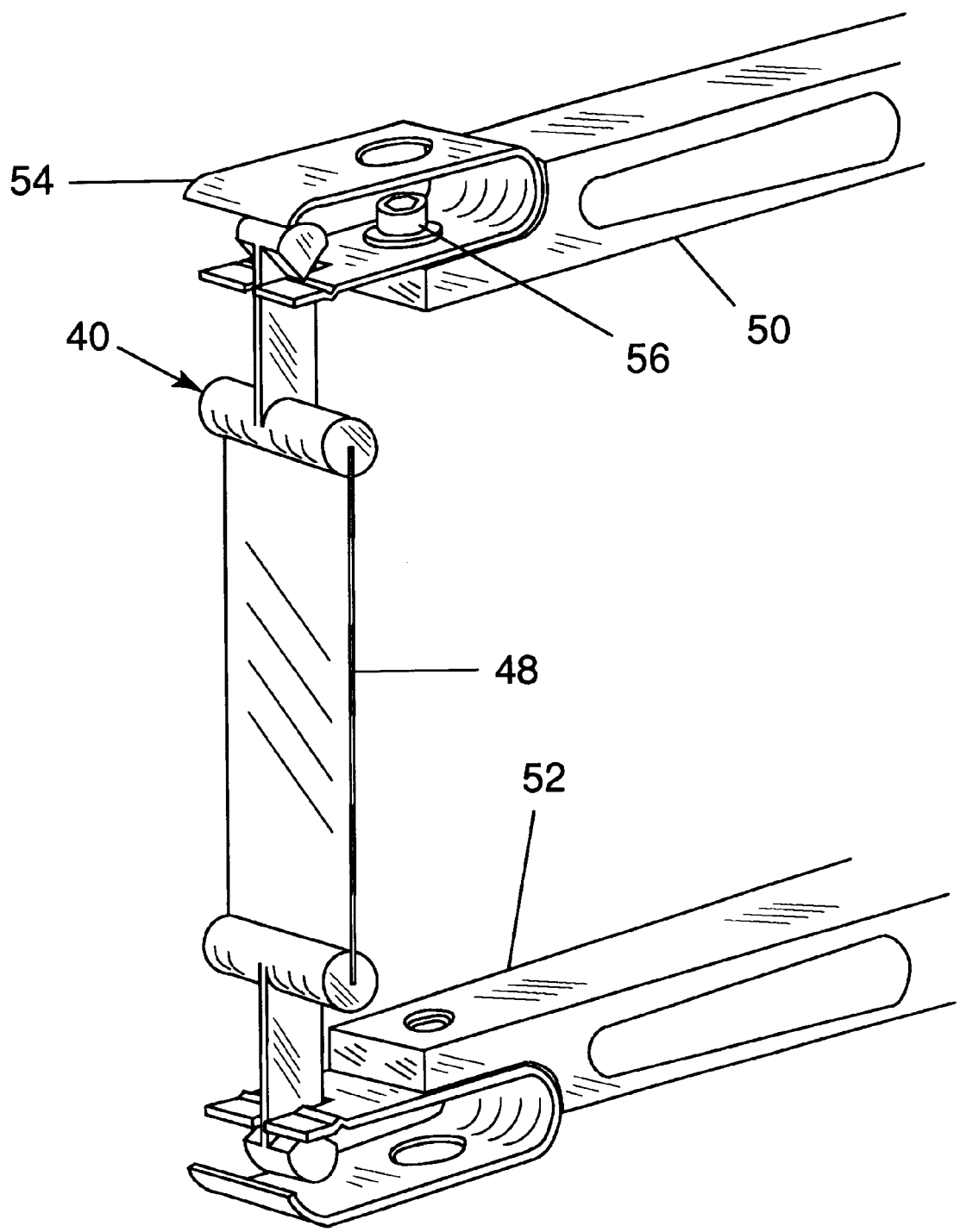
FIG. 4 is a perspective view of the preferred embodiment of the invention mounted on scroll saw arms with the scroll saw table removed for clarity.
Figure 5:
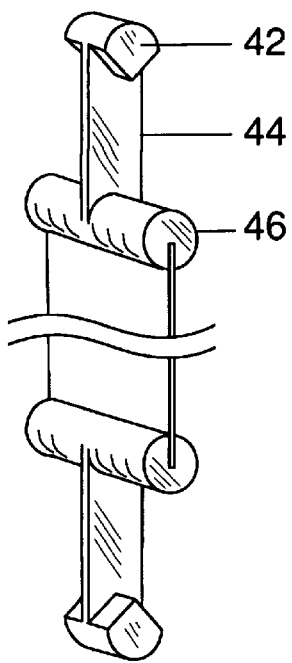
FIGS. 5, 6, 7, 8, and 9 are perspective views of the preferred embodiment of the invention incorporating potential pivot head variations and extender variations.
Figure 6:
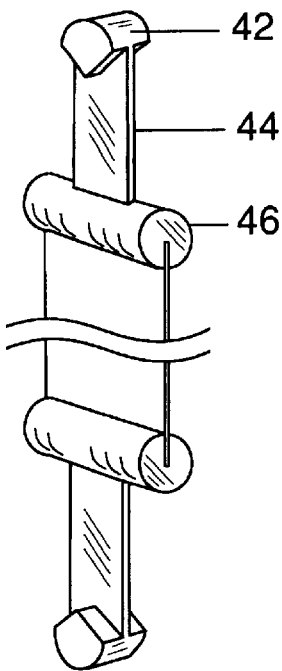
Figure 7:
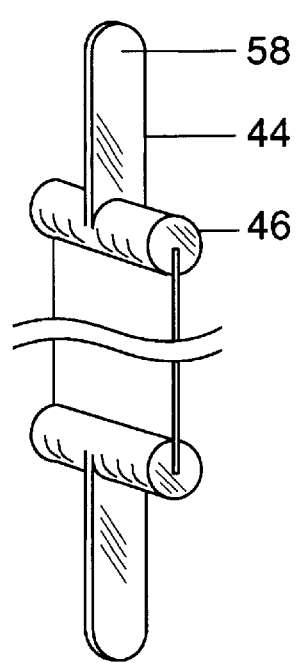
Figure 8:
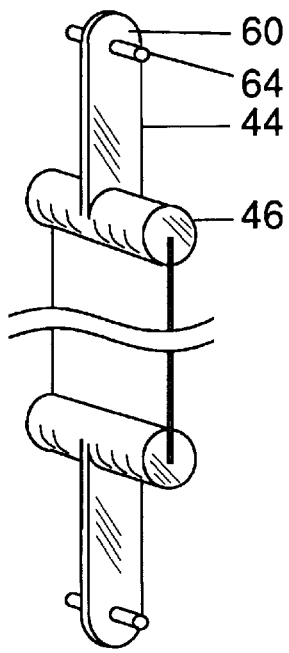
Figure 9:
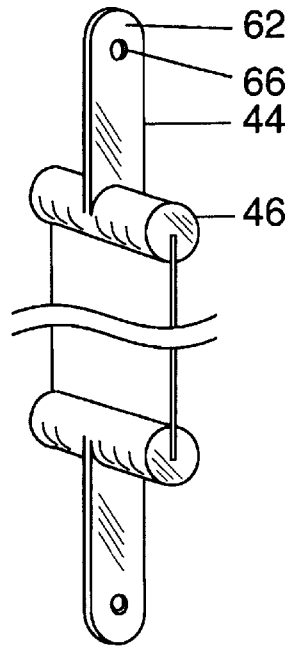

The preferred embodiment of the invention, in which abrasive member holder 40 is comprised of a pin-end pivot head 42, pin-end blade extender 44, pin-end abrasive member head 46, and abrasive member 48, is illustrated in FIGS. 1, 2, and 3. FIG. 4 shows the embodiment of the invention mounted on an upper scroll saw arm 50 and a lower scroll saw arm 52 with the saw table removed for clarity. The reciprocating saw, which is of the usual construction, is driven by a motor. The saw blade from a scroll saw is removed and replaced by a symmetrically disposed longitudinally extended, horizontally extended abrasive member 48 held supported and affixed by holders 40. Holder 40 is mounted on pin-end clamping plates 54. Clamping plates 54 are mounted using clamping plate mounting screws 56 on an upper scroll saw arm 50 and a lower scroll saw arm 52. Holders 40 are suspended between clamping plates 54 and the saw tensioned to attain normal scroll saw blade tensioning. Abrasive member head 46, as represented, is comprised of a cylindrical portion. Extender 44 is attached to the midpoint, normal to the axis of the cylinder at a spaced location as to support abrasive member head 46. Abrasive member 48 is attached into and onto abrasive member head 46 oriented parallel to the axis of the cylinder. Extender 44, as incorporated, is shown as a flat, thin, long section attached to abrasive member head 46 and pivot head 42. Pivot head 42 comprises a means of pivoting abrasive member holder 40 on a pin-end scroll saw or as a method of clamping extender 44 in a pin-less blade mounting system. Pivot head 42 is comprised of a semicircular cylindrical cross-sectioned portions with an axis parallel to abrasive member head 46. An angled V-shaped corner edge section completes the second half of pivot head together with the semicircular cylindrical section parallel to abrasive member head 46. An angled corner edge parallel to the abrasive member head 46 provides the pivot point for mounting of the abrasive member holder on a scroll saw. Extender 44 can be provided without pivot head 42 as pin-less pivot head 58. FIGS. 5–9 illustrate sample variations of pivot head 42. Pivot head variations may be pin-end pivot head 42 and pin pivot head 60, plain pin-less pivot head 58 and pin-hole pivot head 62, molded, cast, of material composition depending on the purpose and versatility for which each pivot head is used. Pivot head 42 may have an axis parallel to, or orthogonal to, abrasive member head 46, FIG. 6. Pivot head 58 has extender 44 lengthened, FIG. 7. Pivot head 60 has pivot pin 64, common to pin-end scroll saw blades, passing through extender 44. Pivot head 62 has pivot head hole 66 passing through extender 44 for mounting on pivot pins which are an integral part of a saws mounting arms and system, FIG. 9. Abrasive member holder 40 can be made of metal, plastic, molded, or castable materials depending on the use, durability, longevity, disposability, convenience, and purpose for which the abrasive member holder is used. Abrasive member head 46 can be provided in various widths, lengths, thicknesses, cross-sectional shapes, orientations, and material composition depending on the purpose versatility and materials for which the abrasive member head with member is used. Abrasive member head 46 is typically ¼"–½" wide, can be wider or narrower, and can be made to fit the hole or slot in a scroll saw table through which a blade passes. The length of the overall abrasive member heads 46 and abrasive member 48 may be scroll saw or C-shaped saw dependent. Abrasive member 48 can be attached and fixed into and onto the abrasive member head by adhesives, castings, hanging, suspending, molding, stapling, clamping, suspending, screwing, or like. Such abrasive members can be provided with a variety of compositions grit, supports, meshes, and impregnated materials depending on the purpose and versatility for which an abrasive member 40 is used. Alternatively, abrasive member holder 40 can retain a shaped abrasive member, a circular abrasive, a cylindrical abrasive, a semi-circular abrasive, a V-shaped member, a round abrasive member, a narrow abrasive member, a square abrasive member, a rigid abrasive member, a flexible abrasive member, and components in combination. Such abrasive members come in a variety of grit sizes, rasping surfaces, honing surfaces. Preferably the abrasive member is symmetrically held by the abrasive member holder, with symmetrical attachment. Extender 44 can be provided in various widths, lengths, thicknesses, cross-sectional shapes, and material composition. When it is necessary to change an abrasive member it is sufficient to loosen the tensioning device on the saw, remove abrasive member holders as a blade would be removed, and replace it with a new, desired abrasive member with holder 40, then retension the holders using the saw's tensioning device.

Figure 10:
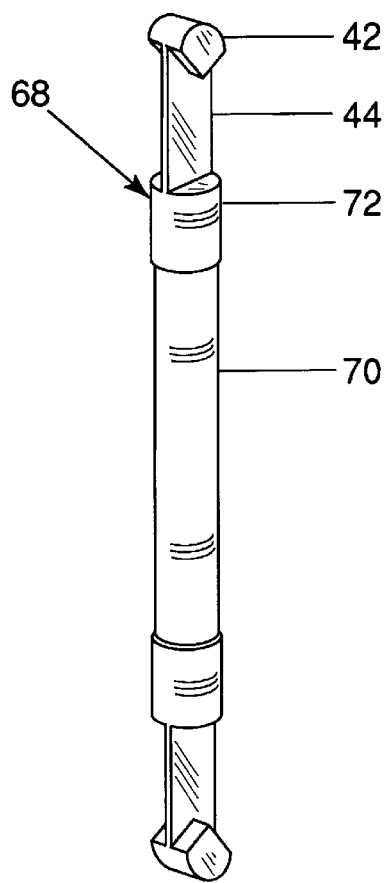
FIG. 10 is a perspective view of the preferred embodiment of the invention incorporating a round cross-sectional abrasive member into the abrasive member head.
Figure 11:
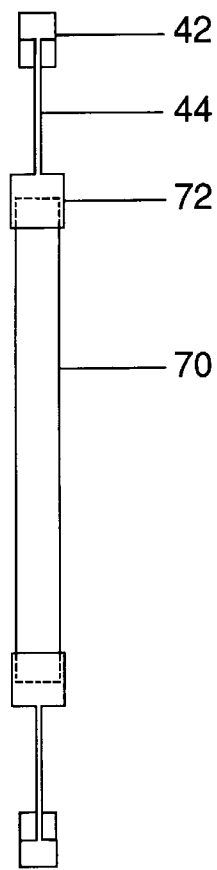
FIG. 11 is a front view of a preferred embodiment of the invention.
Figure 12:
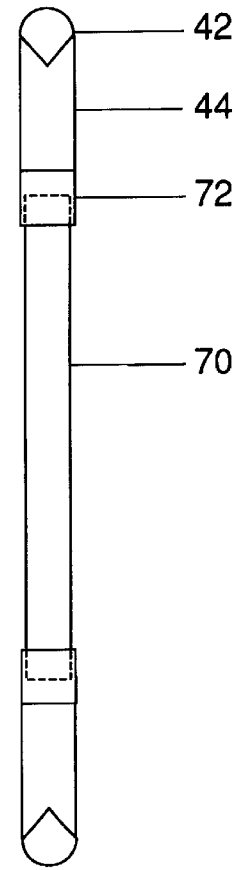
FIG. 12 is a side view of a preferred embodiment of the invention.
Figures 13, 14, 15, 16:
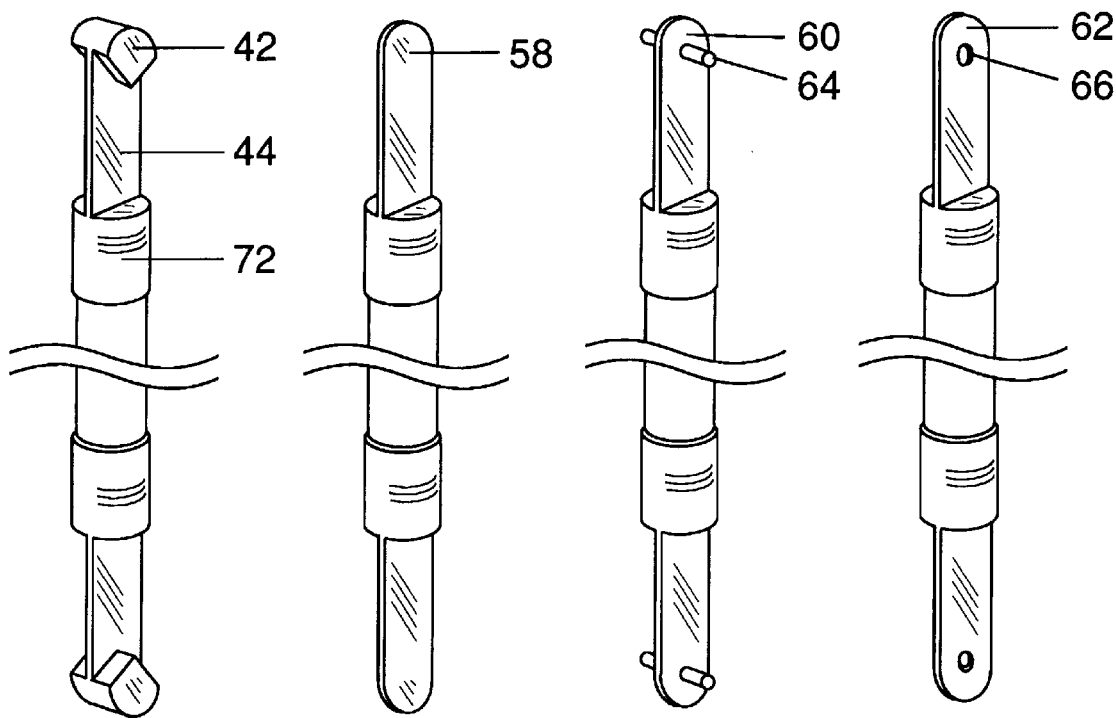
FIGS. 13, 14, 15, and 16 are persepctive views of the preferred embodiments of the invention incorporating a sample of abrasive members of round cross-sectional areas containing pivot head and extender variations.

FIGS. 10, 11, and 12 illustrate a perspective, front, and side view, respectiviey, of an embodiment of the invention in which round abrasive member holder 68 is comprised of a cylindrical abrasive member 70, attached into cylindrical abrasive member head 72, with pivot head 42, and extender 44. Abrasive member head 72 is comprised of a cylindrical cross-sectional portion with an axis parallel to the longitudinal axis of the abrasive member holder. Extender 44 is attached to abrasive member head coincident with the axis of abrasive member head 72. FIGS. 13–16 illustrate perferred embodiments of the invention with abrasive member head 68 associated with pivot heads 42, 58, 60, and 62. Abrasive member 70 can also be provided in various widths, lengths, thicknesses, cross-sectional shapes, and material composition, such as grits, supports, meshes, impregnating materials, cutting surfaces, depending on the purpose and versatility for which abrasive member holder 68 is used.

Figure 17:
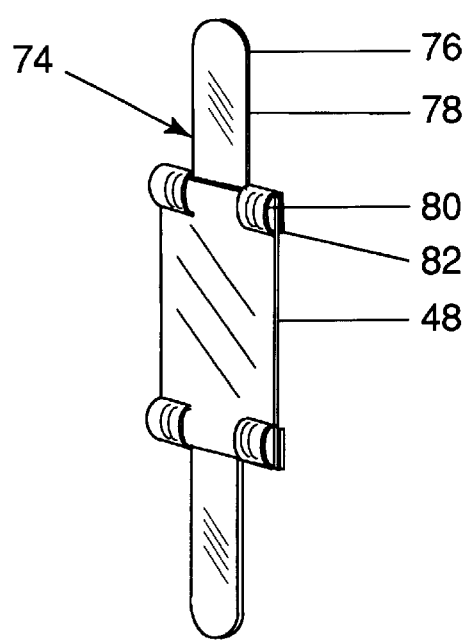
FIG. 17 is a perspective view of an embodiment of the invention using a one piece abrasive member holder which clamps the abrasive member into the abrasive member head.
Figure 18:
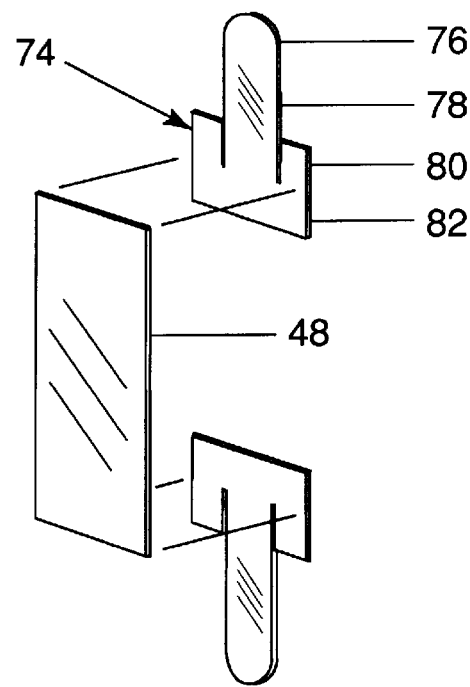
FIG. 18 is an exploded view of a embodiment of the invention using a one piece abrasive member holder.

FIGS. 17 and 18 illustrate an embodiment of the invention in which clamping abrasive member holder 74 is comprised of a pin-less sheet pivot head 76, sheet extender 78, side clamping abrasive member tabs 80, abrasive member holder headplate 82, and abrasive member 48. The components can be separate or an integral part of one piece. In this embodiment, abrasive member holder 74 may be comprised of metal, where holder 74 may be fabricated by stamping from sheet metal. Abrasive member 48 is oriented to allow clamping tabs 80 to fold and clamp abrasive member 48 in place from the top or side. Pivot head 76 may incorporate similiar head variations as 42, 58, 60 with 64, and 62 with 66, as shown in FIGS. 5–9. The simple one piece construction allows rapid fabrication, reduces manufacturing costs, provides narrower hole insertion, and permits disposability.

Figure 19:
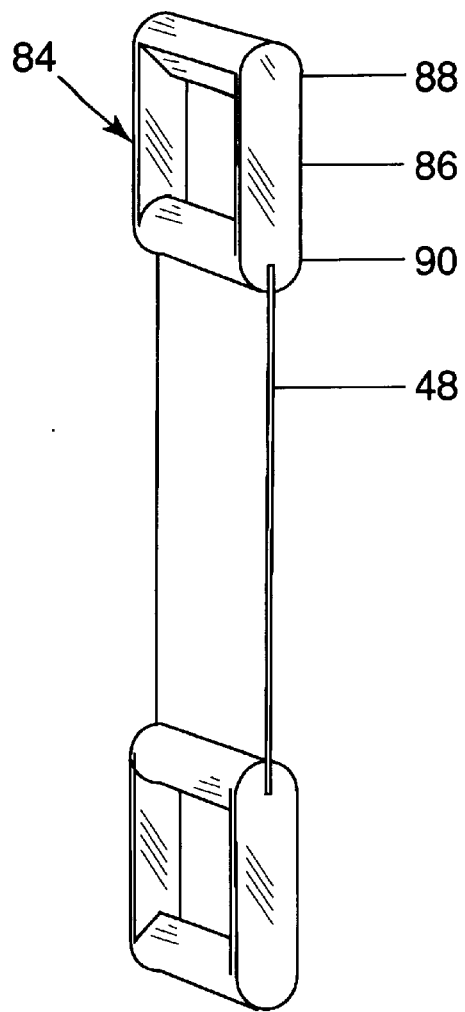
FIGS. 19, 20, and 21 are perspective, front, and side views of a preferred embodiment of the invention which contains two extender members between the pivot head and the abrasive member head.
Figure 20:
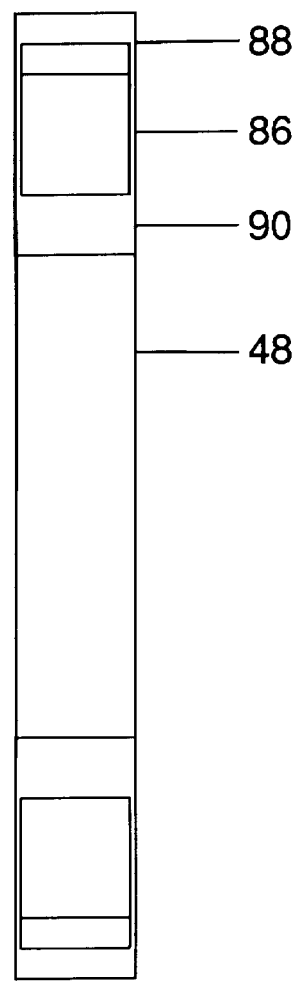
Figure 21:
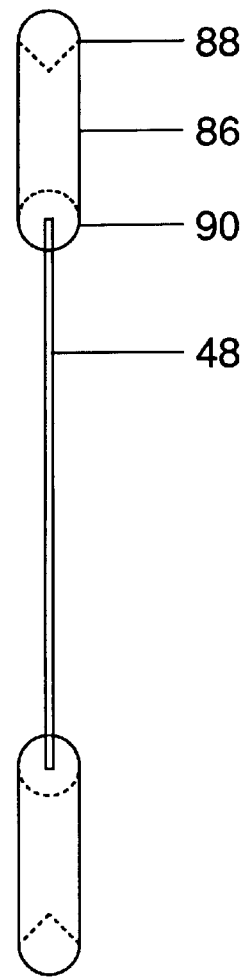
Figure 22:
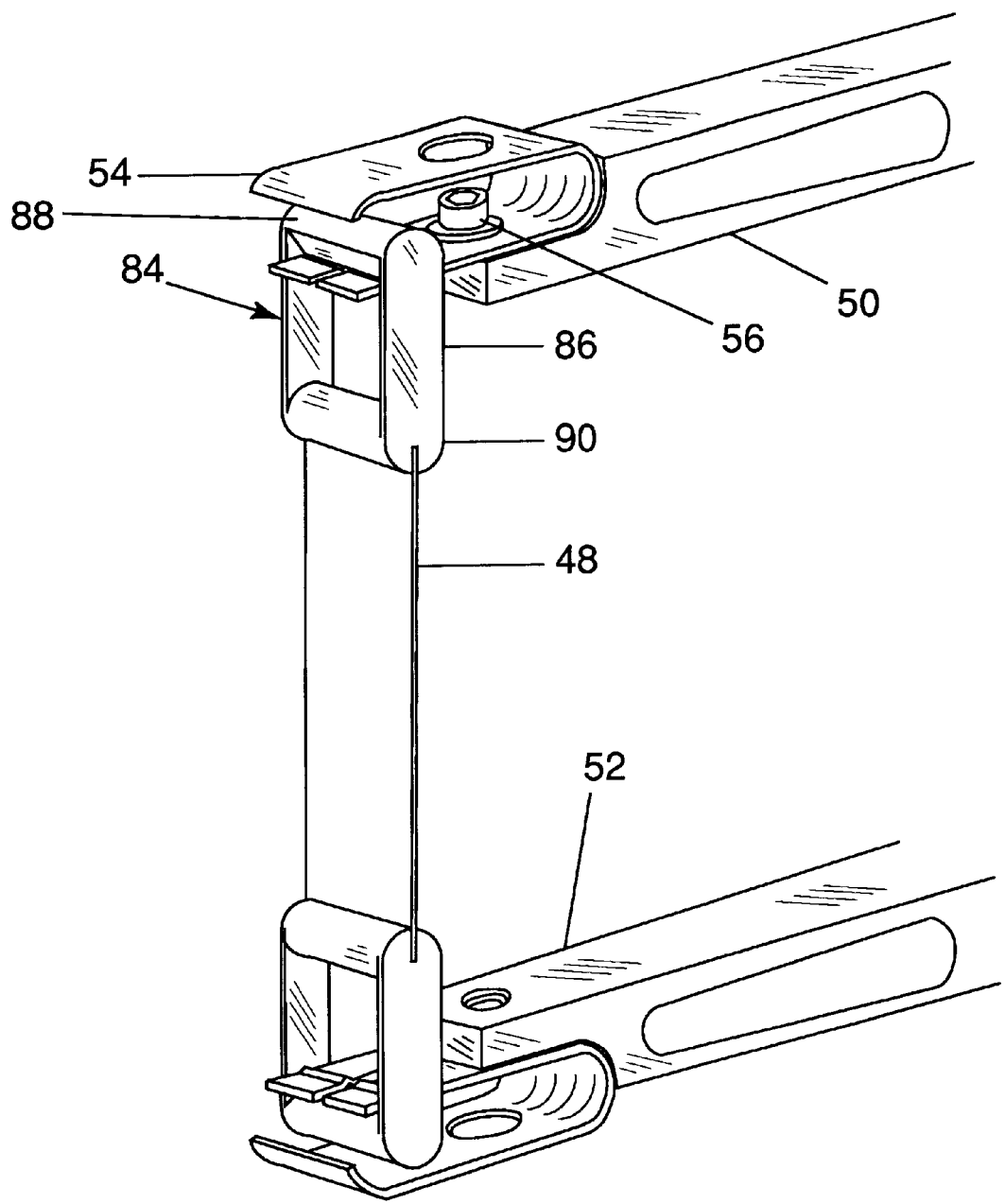
FIG. 22 is a perspective of straddling abrasive member holder 84 on clamping plates 54.
Figure 23:
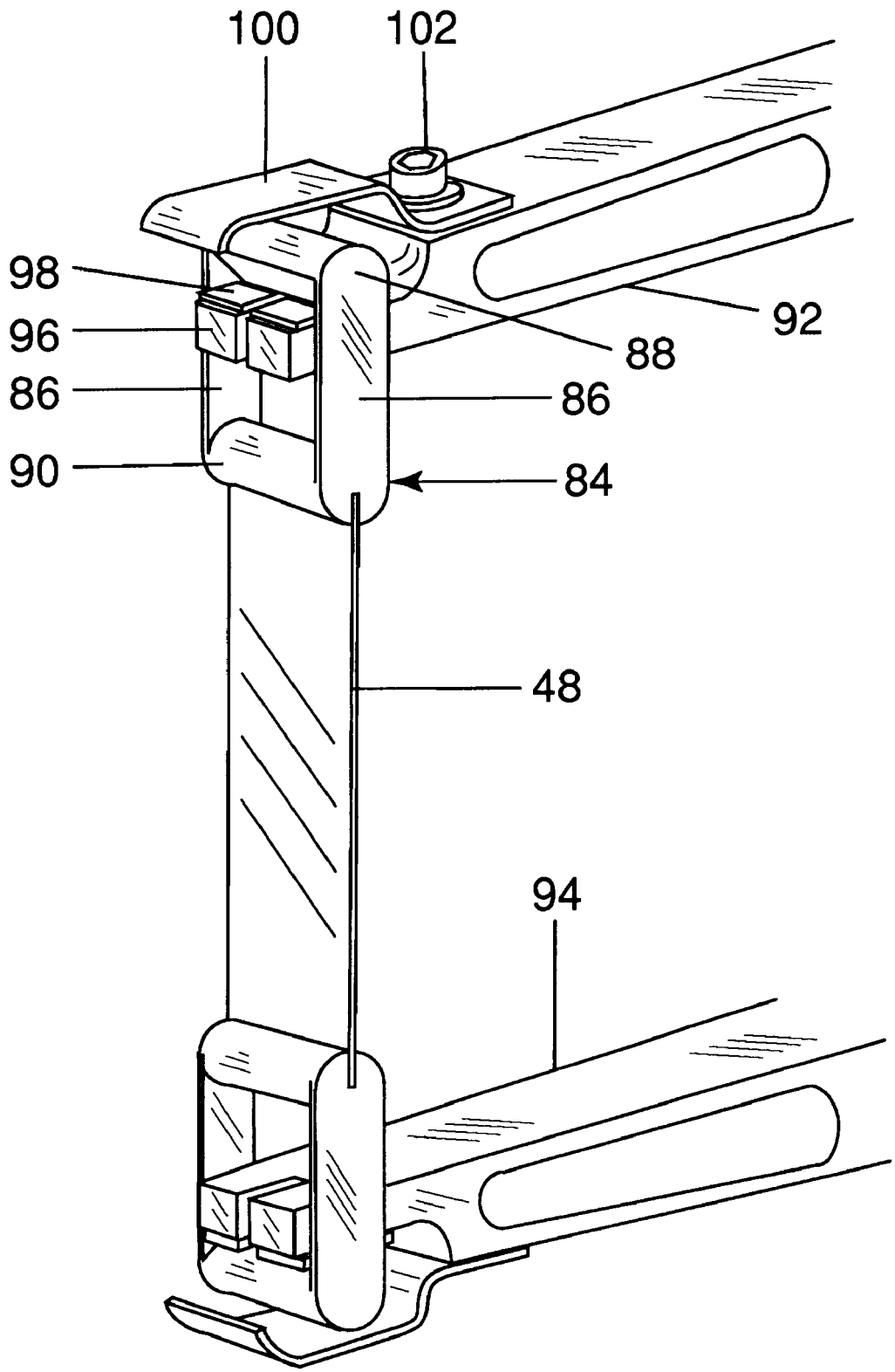
FIG. 23 is a perspective and front view of the preferred embodiment of the invention as shown in FIG. 19 mounted in an alternative mounting plate design on a scroll saw, as compared to FIG. 1.
Figure 24:
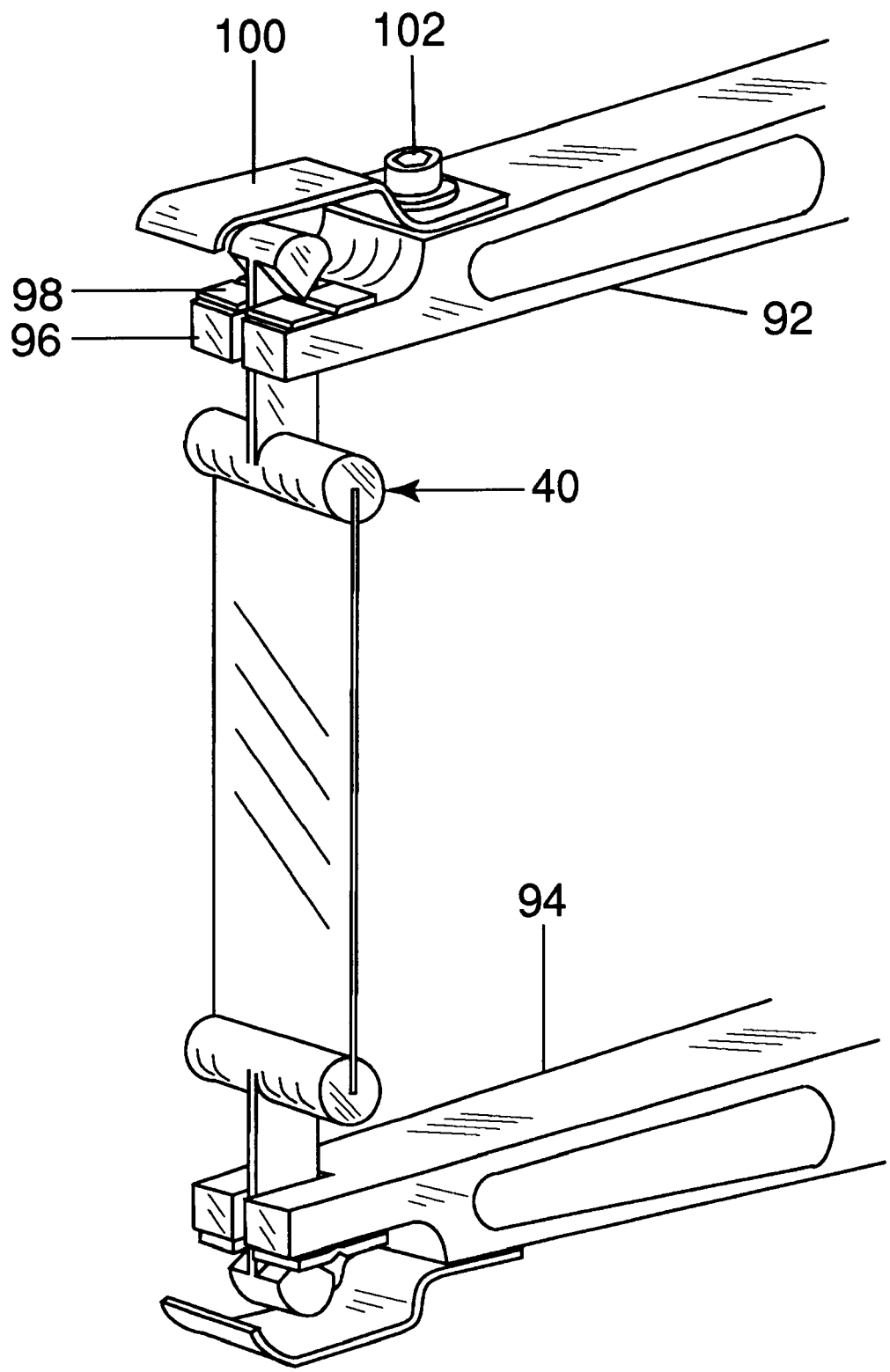
FIG. 24 is a perspective view of the preferred embodiment of the invention as shown in FIG. 1 mounted in an alternative mounting plate design on the arms of a scroll saw.
Figure 25:
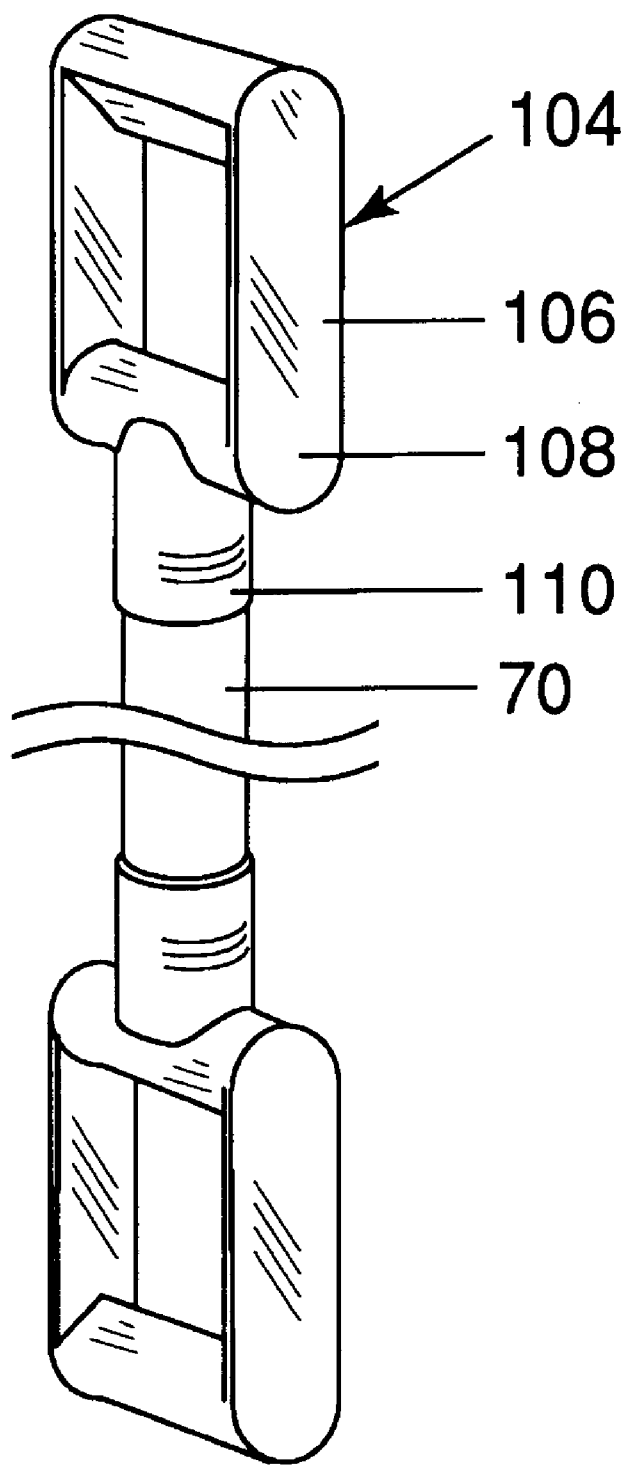
FIG. 25 is a perspective incorporating abrasive member holder 104, and the abrasive member is of round cross-sectional area.

FIGS. 19–21 illustrate an embodiment of the invention in which one piece straddling abrasive member holder 84 is comprised of two blade straddling extender members 86, straddling pivot head 88, straddling abrasive member head 90, and abrasive member 48. Abrasive member head 90 is comprised of a cylindrical cross-sectional portion with extenders 86 at the ends. Extenders 86 are parallel thin flat long sections with the flat surfaces parallel to each other and attached on the same end orthogonally onto abrasive member head 90. The distal ends of extenders 86 are connected by pivot head 88. Pivot head 88 is a half cylindrical and half V-shaped cornered cylinder. Straddling pivot head 88 may also be comprised of a round pin passing through and connecting extenders 86 at the pin ends. FIG. 22 illustrates abrasive member holder 84 suspended from mounting clamping plates 54, which is a variation of the mounting system shown in FIG. 4. FIG. 23 illustrates a method for placement of abrasive member holder 84 on a alternative scroll saw arm mounting method. Holder 84 is suspended between upper straddling scroll saw arm 92 and lower straddling scroll saw arm 94 on straddling mount 96 resting on pivot support plate 98. Safety plate 100 is mounted on arm 92 by safety plate screw 102. FIG. 24 illustrates holders 40 suspended between straddling mounts 96 resting on pivot support plate 98 on the alternative scroll saw mounting methods. FIG. 25 illustrates an embodiment of a straddling cylindrical abrasive member holder 104 in which abrasive member 70 is of round cylindrical cross sectional area. Straddling abrasive member head 106 is comprised of two cylindrical portions upper abrasive member head 108 and joining abrasive member heads 110 connected orthogonally forming a T-shaped abrasive member head. Abrasive member heads 84 and 104 can be provided to accept various widths, lengths, thicknesses, cross-sectional areas, shapes, orientations of abrasive members with materials compositions such as grits, supports, meshes, impregnating materials and cutting surfaces. Abrasive member head 104 can be provided in various widths, lengths, thicknesses, cross sectional shapes, orientations and material composition depending on the purpose versatility and material for which the abrasive member head with abrasive member is used.

Figure 26:
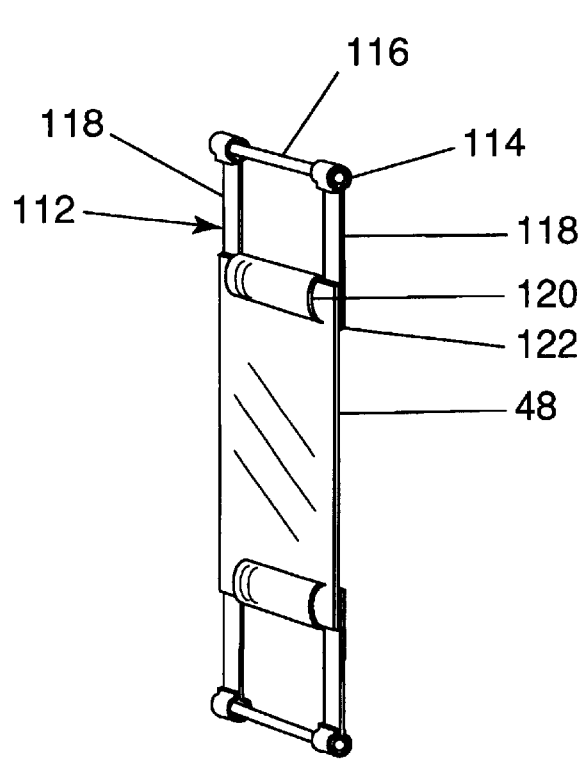
FIG. 26 is a perspective view of an embodiment of the invention using a one piece rectangular, or D-shaped, abrasive member holder which clamps the abrasive member into the abrasive member head, with pivot pin support.
Figure 27:
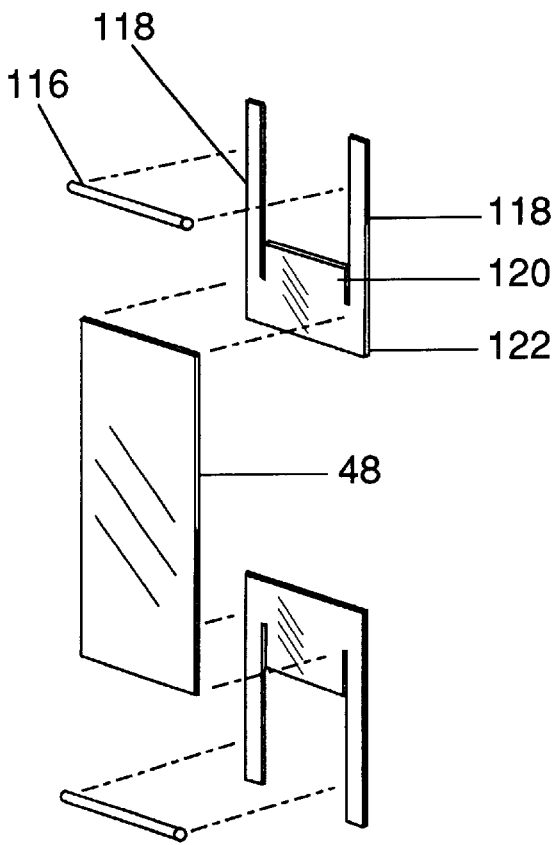
FIG. 27 is an exploded view of a embodiment of the invention using a one piece abrasive member holder.

FIGS. 26 and 27 illustrate an embodiment of the invention in which straddling plate abrasive member holder 112 is comprised of a straddling pin pivot head 114, straddling pivot pin 116, straddling plate extenders 118, plate abrasive member tab 120, straddling headplate 122, and abrasive member 48. The components can be separate, or an integral part of one piece. In this embodiment abrasive member holder 112 may be comprised of metal, and may be fabricated by stamping from sheet metal. Abrasive member 48 is oriented to allow abrasive member clamping tab 120 to fold and clamp abrasive member 48 in place. Pivot head 114 may be formed by folding and clamping the ends of extenders 118 over and around pivot pin 116, clamping pin 116 in place. The simple construction allows rapid fabrication, reduces manufacturing costs, provides narrower hole insertion, and permits disposability.

Another embodiment of the invention for use in a scroll or reciprocating saw is illustrated in FIGS. 28, 29, and 30. Abrasive member plate head 124 is comprised of a headplate pivot head 126, headplate extender 128, back clamping plate 130, front clamping plate 132, headplate 134, clamping nut 136, clamping screw 138, and abrasive member 48. Extender 128 can be provided with pivot head 126 containing headplate pivot pin 140, or without pivot pin 140. Clamping nut 136 can be physically attached to back clamping plate 130. Alternatively, clamping plate 130 can have a threaded aperature, machined and tapped, screw hole replacing clamping nut 136. Extender 128 is comprised of shaped sheet of metal headplate 134 which is affixed by soldering, welding, adhering, or like, to back clamping plate 130. Extender 128, head plate 134 and back clamping plate 130 can be constructed as one piece. Back clamping plate 130 is comprised of metal, or other material, with a hole through which passes clamping screw 138. Clamping screw 138 passes through front clamping plate 132, through back clamping plate 130, and into clamping nut 136. The thickness of extender and headplate 134 material elevating a portion of front clamping plate 132 provides a lever action to aid greater clamping pressure generated by clamping screw 138, clamping nut 136, front clamping plate 132, and back clamping plate 130, clamping abrasive member 48, FIG. 29. Clamping pressure can also be generated by a screw which expands cooperatively hinged clamping plates. A portion of extender 128 may be twisted 90 degrees with respect to head plate 134. Alternatively, it does not require the twist. Abrasive member 48 can be provided in various widths, lengths, thicknesses, cross-sectional shapes, orientations, and material composition depending on the purpose, versatility, and materials for which the abrasive member head with member is used. Typically the width of the abrasive member holder is ¼"–½", can be wider or narrower, and can be made to fit the hole or slot in a scroll saw table through which a blade passes. The length of the abrasive member for the preferred embodiment of the invention is scroll saw or C-shaped saw dependent. Abrasive member 48 can also be attached and fixed into and onto the abrasive member head by adhesives, castings, hanging, suspending, engaging, encasing, closed loops, molding, stapling, clamping, or screwing. Such abrasive members can be provided with a variety of compositions, grits, supports, meshes, and impregnating materials. In scroll saw blade holders where pin-less blade ends are mounted, clamping of the invention in the plain pin-less end blade mounts allows relatively loose to taut tensioning of the abrasive member. It is not necessary to have abrasive member 48 taut at all times since there may be occasions in which it is desireable to have the abrasive member relatively loose to conform to an unusually shaped surface. This is most easily performed with pin-less pivot heads such as 58 and 74 where extenders 44 and 78 are mounted in a pin-less blade holder of a saw. When it is necessary to change abrasive member 48 it is sufficient to loosen the tensioning device on the saw, remove abrasive member holder 124. Clamping screw 138 is loosened to allow abrasive member 48 to be removed and replaced with an new abrasive member. Clamping screw 138 is then tightened and the process repeated for the other end of the abrasive member. Abrasive member holder 124 is then repositioned on clamping plates 54 and the holder retensioned using the saw tensioning device.

Figure 31:
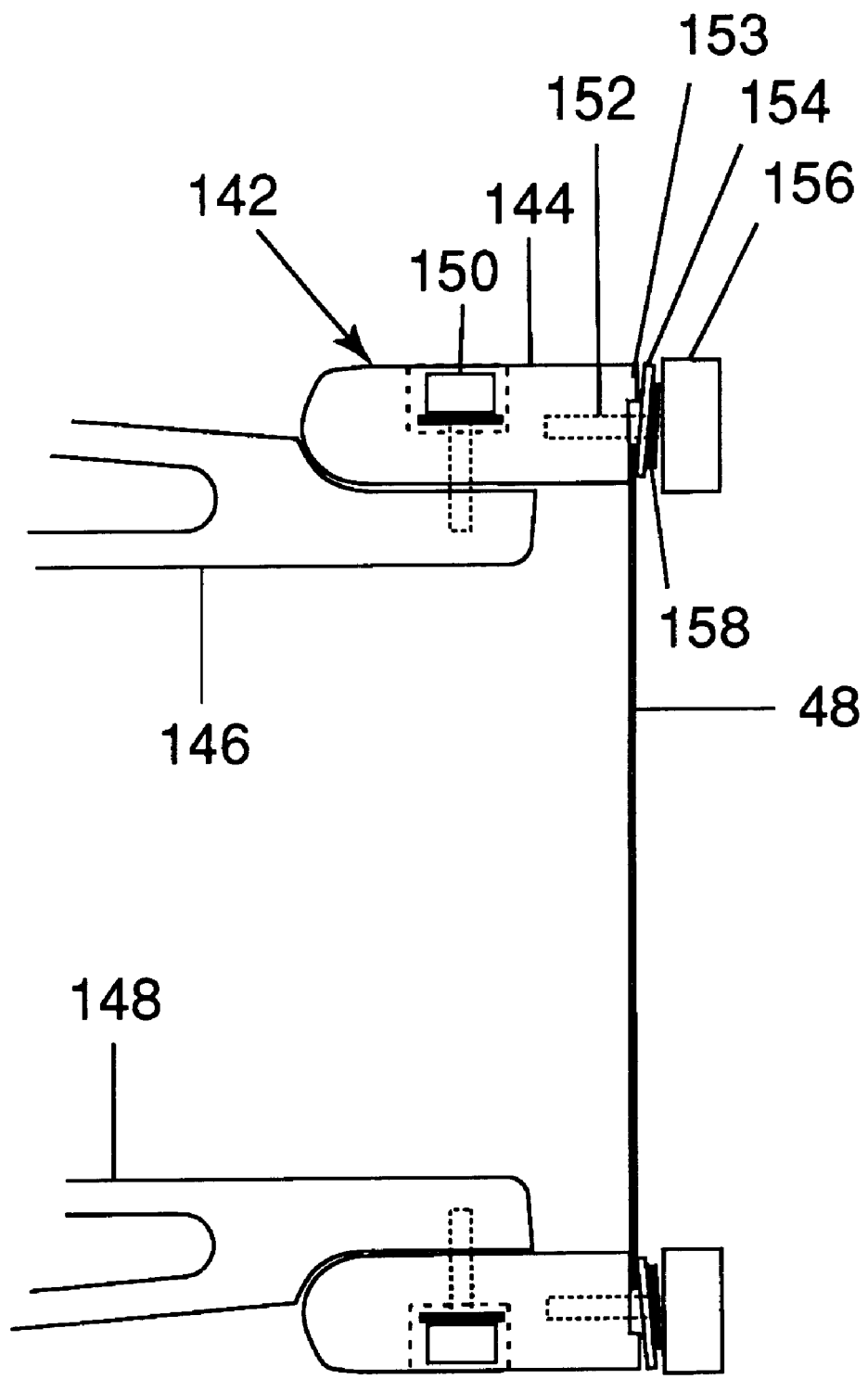
FIG. 31 is a side view of a preferred embodiment of the invention with the abrasive member holder mounted directly on the arms of a scroll saw.
Figure 32:
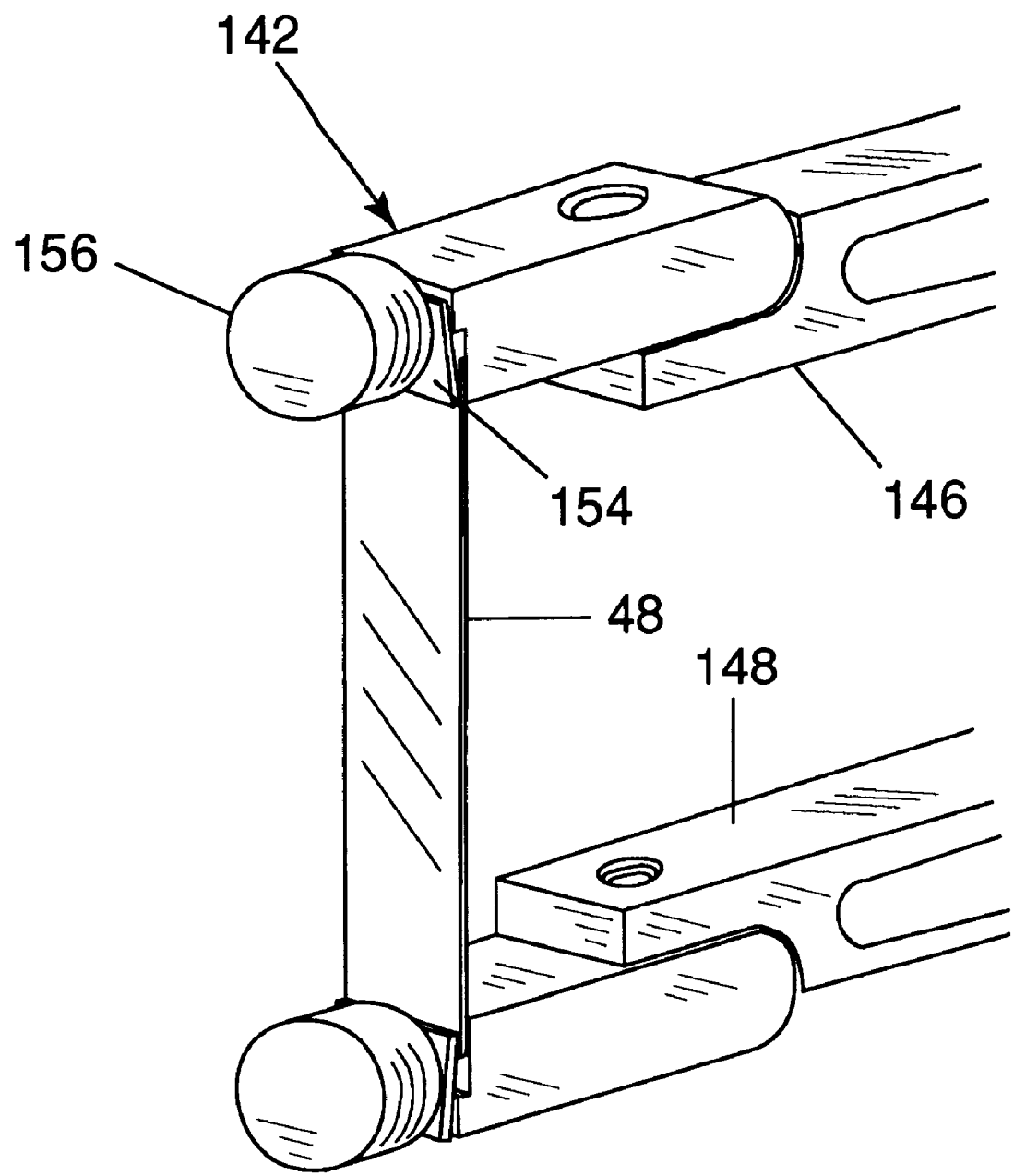
FIG. 32 is a perspective view of a preferred embodiment of the invention with the abrasive member holder mounted directly on the arms of a scroll saw.

FIGS. 31 and 32 illustrate an embodiment of the invention with abrasive member holder 142 mounted directly on the arms of a scroll saw. Abrasive member suspension holder 142 is comprised of suspension head 144 mounted symmetrically on a scroll saw upper arm 146 and lower arm 148 using mounting screw 150. Thumbscrew 152 passes through suspension plate 154 and applies pressure, in conjunction with stepped surface 153, to hold abrasive member 48 between plate 154 and abrasive member head 144 upon tightening of thumbscrew 152 using thumbscrew head 156. Clamping washer 158 may be added to aid tightening. Clamping pressure can also be generated by a screw which expands a cooperatively hinged clamping plate. Holder 142 permits mounting of abrasive members 48 in combination with a variety of cross-sectional shapes, thicknesses, flexibility, widths, abrasive grades and lengths depending on the purpose for which the abrasive member holder is to be used in combination with the abrasive member. Abrasive member holder 142 can be made of metal, plastic, molded, or castable materials, depending on the use, durability, longevity, disposability, convenience, and purpose for which the abrasive member holder is used.

Figure 33:
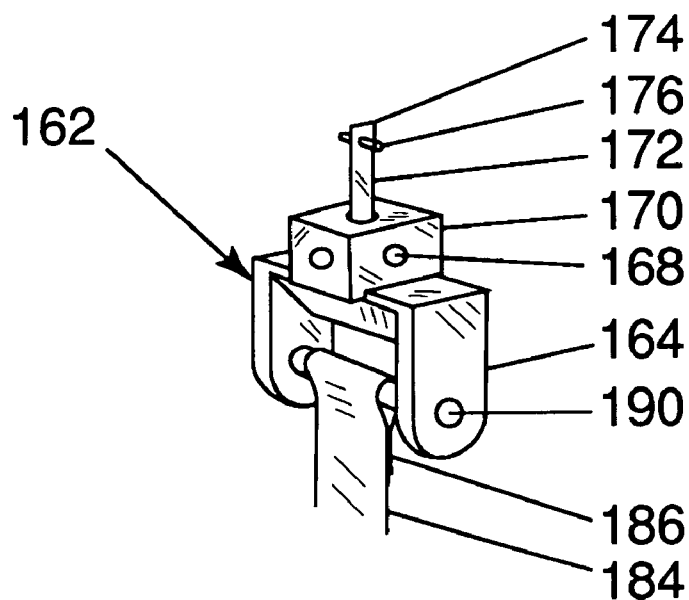
FIG. 33 is a perspective view of a preferred embodiment of the invention for holding a closed looped abrasive member derived from a new use of prior art.
Figure 34:
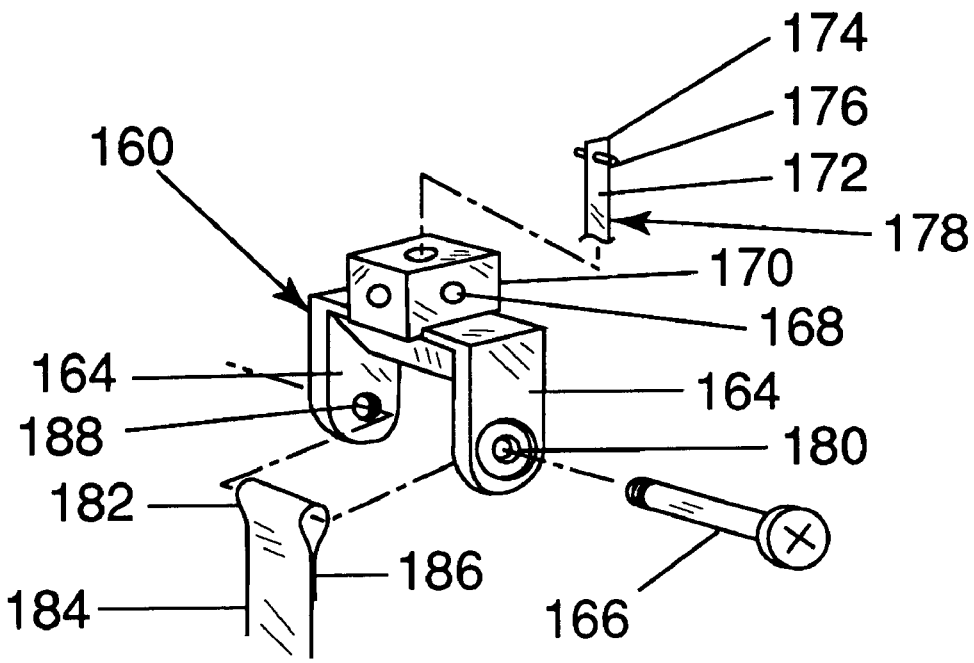
FIG. 34 is an exploded view of a preferred embodiment of the invention incorporating a removeable pin to allow replacement of a closed loop abrasive member of a width no greater or less than the spacing of the removeable pin supports.

By reference to FIGS. 33 and 34, looped abrasive member holder 160 is comprised of abrasive member head with a pair of ears 164, containing support aperture 180 and threaded aperture 188, through which passes loop screw pin 166, as compared to new use of prior art saw blade holder 162. Screw holes 168 formed and placed in the front, right, left and rear of screw clamp body 170 to hold blade extender 172, blade head 174 and optional blade pivot pin 176 derived from upper blade part 178 of a pin-end scroll saw blade in place. Screw pin 166 passes through one of ears 164 at support aperture 180. Screw pin 166 is then received into threated aperture 188 in the other ear 164 and fixed in place by a threaded aperature. The removeability of screw pin 166 allows screw pin 166 to pass through preformed abrasive member loops 182 on symmetrically disposed looped abrasive member 184. The width of the abrasive member at loop 182 should substantially be the width of the space between ears 164. When it is necessary to change looped abrasive member 184 it is sufficient to unscrew and remove screw pin 166, replace looped abrasive member 184 and replace screw pin 166. When it is necessary to change the angle of adjustment of the abrasive member holder relative to the table, workpiece, or scroll saw arms, it is sufficient to unscrew clamping screws 168, rotate uper blade part 178 and then tighten clamping screws 168.

A test was performed using the preferred embodiment of the invention 40 in sanding of intricate cuts on a large multi-piece wooden puzzle to compare hand sanding versus use of embodiment 40. Normal hand sanding of intricate curves, convex and concave pieces, the puzzle pieces required over 6 hours of concentrated and careful work, while with the invention the same job required less than 15 minutes. The use of the invention produced smooth curves with straight edge corners. At all times the operator was able to easily observe and control the sanding progress. The sabre saw or jig saw holder of U.S. Pat. No. 3,914,906 did not allow even and controlled pressure, or observation of the sanding surface. The metal backed adhesive elements did not contour to the convex or concave surfaces, and required numerous time consuming abrasive changes due to delamination and abrasive damage, while the present embodiment of the invention 40 allowed rapid changing, adjustment, and finished surfaces rapidly.

A test was performed to address the "new use" aspect of embodiment 160 as compared to U.S. Pat. No. 4,953,431, prior art 162, and modifcations outlined and shown in FIG. 34. FIG. 33 illustrates inverted holder 162 to use the device in a way different from the intent for scroll saw blades. An attempt to mount a ½" wide abrasive member between the clamping set screws for saw blade mounting was unsuccessful. Inverting the blade holder function changes the pivot mounting points and mounting of the holder on the scroll saw. A ½" end of a broken pin-end scroll saw blade 178 was clamped between clamping screws 168, as shown in FIG. 34. Pin-end blade end 178 becomes the support pivoting mount for pin-less holders 160 and 162 on the scroll saw. Pin-end blade component is comprised of blade head 174, blade pivot pin 176, and blade extender 172. A ½" wide portion of abrasive member 48 was hung over immoveable support pin 190 and glued at abrasive member adhesive junction 186 to form a closed loop around non-removeable pin 190. The opposite symmetrically disposed end of the abrasive member was constructed identically. This gave a very complicated, bulky, and non-disposable holder which has been greatly simplified by the present embodiment of holder 40 as shown in FIG. 1. Present embodiment 40 was compared to holder 162. Holder 162, as constructed, required a considerably larger hole for insertion, over ¾"×½", as compared to a smaller preferred embodiment 40 and 74 which required ½"×¼", or smaller.

When tensioned and used on the scroll saw, closed loop junction 186 of holder 162 broke free. When an alternative abrasive grit was desired on holder 162, abrasive member 48 had to be cut away, and replaced with gluing by an alternative abrasive member.

A test requiring a ¼" wide abrasive member on holder 40 versus holders 160 and 162 were compared. A ¼" wide looped abrasive member 48 was glued in place on holder 162, replacing the ½" abrasive member 48, as previously described. Holder 162 was mounted in the scroll saw and operated. During evaluation the ¼" wide abrasive member 48 moved back and forth along pin 190 deminishing considerably the control of the abrasive member on the workpiece, unevenly stressing and tensioning abrasive member 48, and bending extender 172. Mounting of the preferred embodiment of holder 40 containing a ¼" abrasive member 48, centered and immobile in holder, provided precise control. The width of abrasive head 46 was shortened to match the width of the abrasive member, and in this construction holder 40 required a ¼"×¼" hole for insertion in the workpiece. Embodiment 40 eliminates set screws 168 to hold the pin-end of the shortened scroll saw blade 178, eliminates looping of abrasive member 48 and adhesive junction 186 failure, and eliminates the need to provide a removeable pin 166 to pass through a fixed loop of abrasive member 184 into threaded aperture 188. Present embodiment 40 simplifies and eliminates the problems shown above, shows a simplified construction, while providing an inexpensive, economical, uncomplicated and easy to use sanding accessory for reciprocating saws.

SUMMARY

An abrasive member holder for a reciprocating saw has been provided which makes it possible for rapid replacement, interchangeability, and variability of an abrasive member. The abrasive member holder makes it possible to perform abrasive techniques varying from heavy rasping to sanding to fine finish sanding to fine honing to polishing using interchangeable, reusable, disposable, abrasive member holders in combination with abrasive members. The abrasive member holder will hold abrasive members selected to abrade wood, metal, plastic, glass, composites, and other materials. The abrasive member holder will hold abrasive members to give a minute sanding surface, a broad flat sanding surface, a curved sanding surface, allowing a smooth sanded edge. The invention eliminates waves and ridges left by hand sanding and cutting, yet provides a tool that is thin enough, broad, and shaped, to get into areas not readily accessible with any other sanding tool or device. This invention is particularly suitable for scroll work which is now largely left unsanded, unfinished, unshaped or unsanded by hand labor.

To change the preferred embodiments of the invention on a saw, the invention is simply removed and replaced with an identical embodiment constructed with an alternative abrasive member. The interchangeable, disposable and inexpensive nature of construction of the preferred embodiment of the invention allows facile and quick substitution. For example, a wide and thin abrasive member, ½" wide, x" long and y" thick permits access to minute slits of broad flowing sanding requirements. Alternatively, the abrasive member holder can retain a shaped abrasive member, a circular abrasive, a cylindrical abrasive, a semi-circular abrasive, a V-shaped member, a round abrasive member, a narrow abrasive member, a square abrasive member, a rigid abrasive member, a flexible abrasive member, and components in combination. Such abrasive members come in a variety of grit sizes, rasping surfaces, honing surfaces. Preferably the abrasive material is symmetrically held by the abrasive member holder, with symmetrical attachment.

The abrasive member holder can be employed in a woodworking shop, craft shop, on the job, in jewelry making, in model making, in a metal shop, in metal cutter sharpening, for use in particular trades or hobbies, such as jewelers, filigree and fret woodworkers, gunsmiths, or like.

The current embodiments of the invention fit most scrolls saws and scroll saw mounting mechanisms, and does not require a special holder or adaptor, does not require add-on or additional parts, or replacement parts for saw design components to facilitate its use. It should be noted that blade and extender clamps having different configurations can be used and that an alignment tool having a recess of the proper configuration for each different clamping configuration and saw can be provided to assure correct alignment. Any misalignment may be automatically corrected by the flexibility of the abrasive member, or abrasive member holder.

While various other changes may be made in the detail construction, certain features and subcombinations for utility may be employed without reference to other features and subcombinations, it is understood that such changes will be within the spirit and scope of the present invention as defined by the appended claims. Since may possible embodiments may be made of the invention without departing from the scope thereby it is additionally understood that all matter herein set forth or shown in the accompanying drawings is to interpreted as illustrative and not in a limiting sense.

| Part Numbers and Identification |
|---|
| 40 Abrasive member holder |
| 42 pin-end pivot head |
| 44 pin-end blade extender |
| 46 pin-end abrasive member head |
| 48 abrasive member |
| 50 upper scroll saw arm |
| 52 lower scroll saw arm |
| 54 pin-end clamping plates |
| 56 clamping plate mounting screw |
| 58 pin-less pivot head |
| 60 pin pivot head |
| 62 pin-hole pivot head |
| 64 pivot pin |
| 66 pivot head hole |
| 68 round abrasive member holder |
| 70 cylindrical abrasive member |
| 72 cylindrical abrasive member head |
| 74 clamping abrasive member holder |
| 76 pin-less sheet pivot head |
| 78 sheet extender |
| 80 side clamping abrasive member tabs |
| 82 abrasive member holder headplate |
| 84 straddling abrasive member holder |
| 86 straddling extender members |
| 88 straddling pivot head |
| 90 straddling abrasive member head |
| 92 upper straddling scroll saw arm |
| 94 lower straddling scroll saw arm |
| 96 straddling mount |
| 98 pivot support plate |
| 100 safety plate |
| 102 safety plate screw |
| 104 straddling cylindrical abrasive member holder |
| 106 straddling abrasive member head |
| 108 upper abrasive member head |
| 110 joining abrasive member head |
| 112 straddling plate abrasive member holder |
| 114 straddling pin pivot head |
| 116 straddling pivot pin |
| 118 straddling plate extender |
| 120 plate abrasive member tab |
| 122 straddling headplate |
| 124 abrasive member plate head |
| 126 headplate pivot head |
| 128 headplate extender |
| 130 back clamping plate |
| 132 front clamping plate |
| 134 headplate |
| 136 clamping nut |
| 138 clamping screw |
| 140 platehead pivot pin |
| 142 abrasive member suspension holder |
| 144 suspension head |
| 146 upper arm |
| 148 lower arm |
| 150 mounting screw |
| 152 thumbscrew |
| 153 stepped surface |

-continued

Part Numbers and Identification 154 suspension plate
156 thumbscrew head
158 clamping washer
160 looped abrasive member holder
162 new use of prior art saw blade holder
164 ears
166 loop screw pin
168 screw holes
170 screw clamp body
172 blade extender
174 blade head
176 blade pivot pin
178 upper blade part
180 support aperture
182 abrasive member loop
184 looped abrasive member
186 abrasive member adhesive junction
188 threaded aperture
190 support pin

What is claimed:

1. An abrasive member holder for suspending an abrasive member on a reciprocating saw, the abrasive member holder comprising an abrasive member head (46) for holding and encasing at least one end of said abrasive member, an elongated extender (44) joined normal to abrasive member head (46) so as to support said abrasive member head in the form of a T-shape, and a pivot head (42) joined to the extender (44) distal to the abrasive member head (46), said pivot head (42) being joined normal to the extender (44), said pivot head (42) comprising a V-shaped edge, so as to support said extender and abrasive member head.

2. An abrasive member holder for suspending a cylindrical abrasive member on a reciprocating saw, the abrasive member holder comprising a cylindrical abrasive member head (72) and an elongated extender (44) joined to the abrasive member head (72) so as to support said abrasive member head, said abrasive member head (72) being for holding and encasing at least one end of said cylindrical abrasive member, an axis of the cylindrical abrasive member head being coincident with an axis of the elongated member, and a pivot head (42) joined to the extender (44) distal to the cylindrical abrasive member head (72), said pivot head (42) being joined normal to extender, said pivot head (42) comprising a V-shaped edge, so as to support said extender and said abrasive member head.

3. An abrasive member holder for suspending an abrasive member on a reciprocating saw, the abrasive member holder comprising an abrasive member head (46) for holding and encasing at least one end of said abrasive member, an elongated extender (44) joined normal to abrasive member head (46) so as to support said abrasive member head in the form of a T-shape, and a pin (64) passing through the extender (44), so as to support said extender and abrasive member head.

4. An abrasive member holder for suspending an abrasive member on a reciprocating saw, the abrasive member holder comprising an abrasive member head (46) for holding and encasing at least one end of said abrasive member and an elongated extender (44) joined normal to abrasive member head (46) so as to support said abrasive member head in the form of a T-shape, a hole (66) passing through the extender, so as to support said extender and abrasive member head.

5. An abrasive member holder for suspending an abrasive member on a reciprocating saw, the abrasive member holder comprising an abrasive member head (90) for holding and encasing at least one end of said abrasive member and two elongated parallel extenders (86) joined normal to the abrasive member head (90) at respective ends of the extenders, distal ends of the extenders joining a pivot head (88).

6. The abrasive member holder of claim 5 wherein the pivot head (88) comprises a pin through the extenders 86, so as to support said abrasive member head.

7. The abrasive member holder of claim 6 wherein said abrasive member head (112) comprises a head plate (122), a clamping tab (120), two extenders (118), and a pivot pin (116), said clamping tab being positioned to hold and engage said abrasive member, clamping said abrasive member between the clamping tab and the head plate, said extenders being positioned to engage and clamp the pivot pin (116).

8. The holder of claim 5 wherein the pivot head comprises a V-shaped half cylinder, so as to support said abrasive member head.

9. An abrasive member holder for suspending an abrasive member on a reciprocating saw, the abrasive member holder comprising an abrasive member head (46) for holding and encasing at least one end of said abrasive member and an elongated extender (44) joined normal to abrasive member head (46) so as to support said abrasive member head in the form of a T-shape, wherein the abrasive member head comprises a varied cross-sectional member (110) so as to support a varied cross-sectional abrasive member.

10. An abrasive member holder for suspending an abrasive member on a reciprocating saw, the abrasive member holder comprising an abrasive member head (46) for holding and encasing at least one end of said abrasive member and an elongated extender (44) joined normal to abrasive member head (46) so as to support said abrasive member head in the form of a T-shape, wherein said abrasive member head (74) comprises a head plate (82), and clamping tabs (80), said clamping tabs being positioned to engage said abrasive member, clamping said abrasive member between clamping tabs and head plate.

11. The abrasive member holder of claim 10 further comprising a pin passing through the extender (78) distal to the head plate (82).

12. The abrasive member holder of claim 10 wherein a hole passes through extender (78) at a location distal to head plate (82).

13. An arrangement for suspending an abrasive member on a reciprocating saw comprising an abrasive member head (124) for releasably retaining an end of an abrasive member during operation of a saw, the abrasive member head comprising a front clamping plate (132), a back clamping plate (130), an extender (128) with headplate (134), a clamping screw (138) and a nut (136) for securing said clamping plates to said headplate and for securing said abrasive member therebetween.

14. The arrangement of claim 13 wherein the securing of said abrasive member is obtained by pivoting the clamping plates about a pivot, the ends of the clamping plates securing said abrasive member therebetween.

15. The arrangement of claim 13 further comprising a pin passing through the extender at a location distal from said abrasive member head.

16. The arrangement of claim 13 wherein a hole passes through the extender at a location on the extender distal from said abrasive member head.

17. An arrangement for suspending an abrasive member (48) on a reciprocating saw, the arrangement comprising an abrasive member head (144) mounted directly on an arm (146) on the saw, the abrasive member head comprising a stepped surface, thumbscrew (152) passing through a suspension plate (154) wherein the thumbscrew is rotatable within a threaded aperature in the suspension head (144) engaging the stepped surface (153) and clamping plate (154) with one another to clamp abrasive member (48) therebetween.

18. A combination comprising an abrasive member (184), a reciprocating saw, a blade extender (172), and an abrasive member holder (160), said abrasive member (184) having at least one loop end portion (182), said abrasive member holder comprising a body, said body having a pair of ears (164) protruding outwardly, said body having an upper portion, a pair of holes (168) located in said upper portion (170), a removeable pin (166) inserted in said ears of said body through apertures (180) and (188) formed in said ears, said pin being inserted in said first aperture (180) through said looped end portion of said abrasive member and through second aperture (188), said body having a hole in the center of the upper portion (170), the pair of holes (168) intersecting said hole located in the center of the upper portion (170), said blade extender being attached to said saw and held in said hole located in the center of said upper portion of said body and being locked by screws.

* * * * *